United States Patent
Schmitt et al.

(10) Patent No.: US 11,637,482 B2
(45) Date of Patent: Apr. 25, 2023

(54) MAGNETIC SENSOR SYSTEM FOR MOTOR CONTROL

(71) Applicant: Analog Devices International Unlimited Company, County Limerick (IE)

(72) Inventors: Jochen Schmitt, Biedenkopf (DE); Enda Joseph Nicholl, Kilmallock (IE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/448,628

(22) Filed: Sep. 23, 2021

(65) Prior Publication Data

US 2022/0115932 A1 Apr. 14, 2022

Related U.S. Application Data

(60) Provisional application No. 63/089,142, filed on Oct. 8, 2020.

(51) Int. Cl.
*H02K 11/215* (2016.01)
*G01D 5/16* (2006.01)

(52) U.S. Cl.
CPC ........... *H02K 11/215* (2016.01); *G01D 5/16* (2013.01)

(58) Field of Classification Search
CPC ............. G01D 5/12–2525; H02K 11/215
See application file for complete search history.

(56) References Cited

U.S. PATENT DOCUMENTS

| 3,538,762 A | 11/1970 | Parkinson et al. |
| 4,506,217 A | 3/1985 | Ley et al. |

(Continued)

FOREIGN PATENT DOCUMENTS

| CN | 108844557 A | 11/2018 |
| DE | 197 22 834 | 12/1998 |

(Continued)

OTHER PUBLICATIONS

Loreit et al., "Novel magnetoresistive length measuring elements and length measurement concept for nm resolutions," Magnetoresistive Sensoren II, 2nd Symposium on Magnetoresistive Sensors and Magnetic Systems, Wetzlar, Germany (Mar. 18, 1993), pp. 87-97.

(Continued)

*Primary Examiner* — Huy Q Phan
*Assistant Examiner* — David B Frederiksen
(74) *Attorney, Agent, or Firm* — Knobbe, Martens, Olson & Bear, LLP

(57) ABSTRACT

The present disclosure provides a magnetic sensor system for monitoring the position of the rotor relative to the stator for use in electronic motor commutation. The system uses two magnetic sensors with a back bias magnet, the magnetic sensors being configured to detect changes in the magnetic field direction caused by the magnetic field interacting with two moveable targets that are being rotated by the motor shaft. The unique phase shift between the signals measured at each sensor can thus be used to determine the relative position between the stator and the rotor. In this respect, the system makes use of the Nonius or Vernier principle to measure rotational displacement, however, the scale of the encoder is defined by the number of motor pole pairs.

18 Claims, 14 Drawing Sheets

(56) References Cited

U.S. PATENT DOCUMENTS

| | | |
|---|---|---|
| 4,724,710 A | 2/1988 | Murty |
| 5,200,747 A | 4/1993 | Betz et al. |
| 5,359,287 A | 10/1994 | Watanabe et al. |
| 5,930,905 A | 8/1999 | Zabler et al. |
| 6,047,605 A | 4/2000 | Garshelis |
| 6,291,989 B1 | 9/2001 | Schroeder |
| 6,363,797 B1 | 4/2002 | Tokumoto et al. |
| 6,366,079 B1 | 4/2002 | Uenoyama |
| 6,439,067 B1 | 8/2002 | Goldman et al. |
| 6,466,889 B1 | 10/2002 | Schödlbauer |
| 6,498,482 B2 | 12/2002 | Schroeder |
| 6,515,571 B2 | 2/2003 | Takeda |
| 6,543,571 B2 | 4/2003 | Tokumoto |
| 6,871,555 B2 | 3/2005 | May |
| 6,924,639 B2 | 8/2005 | Uenoyama |
| 6,941,241 B2 | 9/2005 | Lee et al. |
| 6,973,991 B2 | 12/2005 | Tokumoto et al. |
| 6,978,685 B2 | 12/2005 | Shiba et al. |
| 6,981,423 B1 | 1/2006 | Discenzo |
| 6,988,421 B2 | 1/2006 | Tokumoto |
| 7,028,545 B2 | 4/2006 | Gandel et al. |
| 7,089,809 B2 | 8/2006 | Nakane et al. |
| 7,174,795 B2 | 2/2007 | Feng et al. |
| 7,215,112 B1 | 5/2007 | Redo et al. |
| 7,259,551 B2 | 8/2007 | Mock et al. |
| 7,635,974 B2 | 12/2009 | Guo et al. |
| 7,856,338 B2 | 12/2010 | Maone et al. |
| 7,923,993 B2 | 4/2011 | Takahashi et al. |
| 8,018,224 B2 | 9/2011 | Kurumado |
| 8,024,956 B2 | 9/2011 | Granig et al. |
| 8,289,019 B2 | 10/2012 | Koller et al. |
| 8,575,920 B2 | 11/2013 | Ausserlechner |
| 8,754,640 B2 | 6/2014 | Vig et al. |
| 8,766,623 B2 | 7/2014 | Ausserlechner et al. |
| 8,847,585 B2 * | 9/2014 | Koto .................. G01D 5/145 324/207.2 |
| 8,890,514 B2 | 11/2014 | Masson et al. |
| 9,070,873 B2 | 6/2015 | Herbst |
| 9,322,887 B1 | 4/2016 | Eagen et al. |
| 9,347,799 B2 | 5/2016 | Nazarian et al. |
| 9,379,598 B2 | 6/2016 | Someya et al. |
| 9,429,632 B2 | 8/2016 | Kawano et al. |
| 9,470,506 B2 | 10/2016 | Schaffer |
| 9,475,520 B2 | 10/2016 | Yanai et al. |
| 9,719,771 B2 | 8/2017 | Ausserlechner |
| 9,719,806 B2 | 8/2017 | Foletto et al. |
| 9,739,672 B2 | 8/2017 | Itomi |
| 9,823,092 B2 | 11/2017 | David et al. |
| 9,857,438 B2 | 1/2018 | Werth |
| 9,933,323 B2 | 4/2018 | Schweizer et al. |
| 9,999,107 B1 | 6/2018 | Rivas et al. |
| 10,049,969 B1 | 8/2018 | Liu et al. |
| 10,060,941 B2 | 8/2018 | Bai et al. |
| 10,126,147 B2 | 11/2018 | Fujita |
| 10,155,532 B2 | 12/2018 | Farrelly |
| 10,254,303 B2 | 4/2019 | Grambichler et al. |
| 10,274,507 B2 | 4/2019 | Binder |
| 10,338,158 B2 | 7/2019 | Werth et al. |
| 10,338,159 B2 | 7/2019 | Ausserlechner |
| 10,473,679 B2 | 11/2019 | Fontanesi et al. |
| 10,495,485 B2 | 12/2019 | Burdette et al. |
| 10,605,874 B2 | 3/2020 | Lassalle-Balier et al. |
| 10,613,113 B2 | 4/2020 | Hashimoto et al. |
| 10,627,261 B2 | 4/2020 | Imai |
| 10,656,170 B2 | 5/2020 | Lim et al. |
| 10,732,194 B2 | 8/2020 | Hainz et al. |
| 10,816,318 B2 | 10/2020 | Vandersteegen et al. |
| 10,816,363 B2 | 10/2020 | Ruigrok et al. |
| 10,830,613 B2 | 11/2020 | Tonge et al. |
| 10,837,848 B2 | 11/2020 | Janisch et al. |
| 10,859,404 B2 | 12/2020 | Diegel et al. |
| 10,859,406 B2 | 12/2020 | Richard et al. |
| 10,866,122 B2 | 12/2020 | Weiland et al. |
| 10,962,386 B2 | 3/2021 | Mattheis et al. |
| 2002/0035877 A1 | 3/2002 | Tokumoto |
| 2003/0145663 A1 | 8/2003 | Heisenberg et al. |
| 2003/0173955 A1 | 9/2003 | Uenoyama |
| 2004/0083823 A1 | 5/2004 | Tokumoto |
| 2007/0200564 A1 | 8/2007 | Motz et al. |
| 2008/0250873 A1 | 10/2008 | Prudham et al. |
| 2009/0021246 A1 * | 1/2009 | Uehira .................. G01D 5/04 324/207.25 |
| 2009/0315544 A1 | 12/2009 | Takahashi et al. |
| 2010/0295541 A1 * | 11/2010 | Sano .................. G01D 5/145 324/207.25 |
| 2011/0115481 A1 * | 5/2011 | Katou .................. G01D 5/04 324/207.25 |
| 2012/0056615 A1 | 3/2012 | Ausserlechner |
| 2012/0260746 A1 | 10/2012 | Lee |
| 2013/0169270 A1 | 7/2013 | Delbaere et al. |
| 2013/0241544 A1 | 9/2013 | Zimmer |
| 2013/0305843 A1 | 11/2013 | Lee et al. |
| 2013/0335072 A1 | 12/2013 | Malzfeldt |
| 2015/0022192 A1 | 1/2015 | Ausserlechner |
| 2015/0331069 A1 | 11/2015 | Ausserlechner |
| 2017/0137054 A1 | 5/2017 | Farrelly |
| 2017/0167897 A1 | 6/2017 | Lackermaier et al. |
| 2017/0219383 A1 | 8/2017 | Umehara et al. |
| 2017/0248445 A1 | 8/2017 | Ausserlechner |
| 2017/0276740 A1 | 9/2017 | Schmitt et al. |
| 2017/0314907 A1 | 11/2017 | Taylor et al. |
| 2018/0137962 A1 * | 5/2018 | Takahashi ............. H01F 27/366 |
| 2018/0313912 A1 | 11/2018 | David et al. |
| 2019/0120914 A1 | 4/2019 | Hammerschmidt et al. |
| 2019/0242764 A1 | 8/2019 | Nicholl et al. |
| 2019/0331541 A1 | 10/2019 | Janisch et al. |
| 2020/0041310 A1 | 2/2020 | Lassalle-Balier et al. |
| 2020/0232822 A1 * | 7/2020 | Weiland .................. G01P 3/487 |
| 2020/0232823 A1 | 7/2020 | Weiland et al. |
| 2020/0386576 A1 | 12/2020 | Hammerschmidt |

FOREIGN PATENT DOCUMENTS

| | | |
|---|---|---|
| DE | 102005009923 A1 | 9/2006 |
| DE | 102005018286 | 10/2006 |
| DE | 102007029819 B4 | 2/2012 |
| DE | 102008039331 B4 | 1/2015 |
| DE | 102018214296 A1 | 2/2019 |
| DE | 102017124542 A1 | 4/2019 |
| DE | 102019104895 A1 | 9/2019 |
| EP | 1 353 151 | 10/2003 |
| EP | 1403173 | 12/2006 |
| EP | 3599714 A1 | 1/2020 |
| JP | 61-247568 | 11/1986 |
| JP | 8-320327 | 12/1996 |
| JP | 2004-117114 | 4/2004 |
| JP | 2004-245642 | 9/2004 |
| JP | 2006/119082 | 5/2006 |
| JP | 2007-285741 | 11/2007 |
| JP | 4737372 | 7/2011 |
| WO | WO 2002/071019 | 9/2002 |
| WO | WO 2005/076860 | 8/2005 |
| WO | WO 2008/101702 | 8/2008 |
| WO | WO 2012/010507 A1 | 1/2012 |

OTHER PUBLICATIONS

Decision of Rejection for Japanese Patent Application No. 2019-17000 dated Jun. 29, 2020.
Japanese Office Action dated Mar. 16, 2020, in Japanese Application No. 2019-17000.
Pre-Appeal Examination Report issued in Japanese patent application No. 2019-17000 dated Nov. 6, 2020.
Stritzke et al., "Highly flexible absolute integrated encoder system on GMR-basis", pp. 132-137 (2013).
TLE5x09A16 (D) Analog AMR/GMR Angle Sensors data sheet. (Dec. 2018).
Extended European Search Report in Application No. 21201400.5, dated Feb. 23, 2022.

* cited by examiner

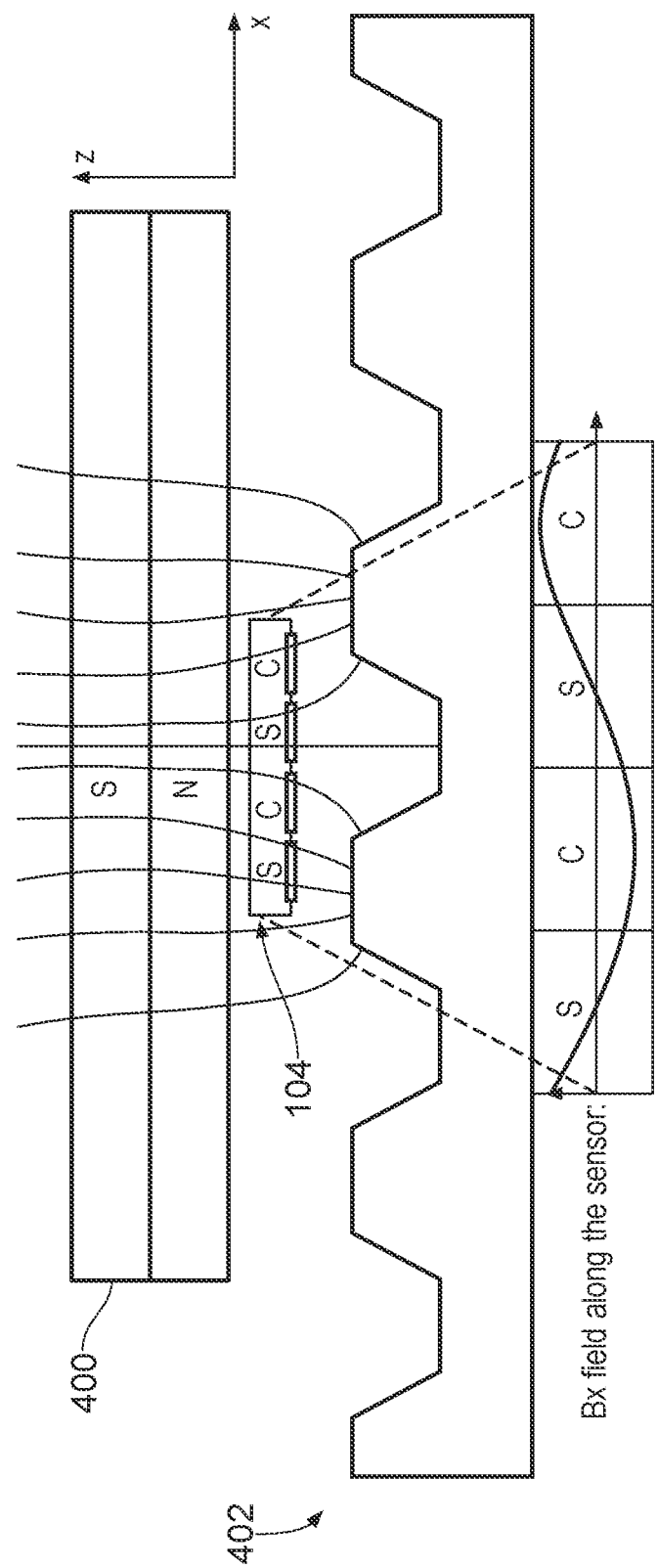

MAGNETIC SENSOR SYSTEM FOR MOTOR CONTROL

FIELD OF THE INVENTION

The present disclosure relates to a magnetic field sensor for use in motor control, and in particular, a back biased magnet sensor for monitoring the rotational position of a motor for use in electronic motor commutation.

BACKGROUND

One of the main benefits of a synchronous motor is that the field rotation in the stator is aligned with the position of the rotor. In general, for an electronic motor drive, it is beneficial to know the position of the rotor relative to the stator to determine the current direction and frequency to hold the motor in synchronization or to drive it in the desired direction.

Brushless DC (BLDC) motors typically have a synchronous architecture, and as the name suggests, have no brush contacts. Consequently, position sensors are used to measure the relative position between the stator and rotor to ensure the correct stator coil energizing sequence is used. This is particularly useful at start up when there is no back electromagnetic force (EMF) available, and thus impossible for the microcontroller to determine the relative rotor and stator positions.

Traditionally, block commutation comprising three Hall switches has been used to indicate the rotor position in synchronous motors.

Another type of electronic motor requiring position monitoring is a reluctance motor. The rotor of a reluctance motor runs synchronous to the rotation of the magnetic field inside the stator, and hence it is again beneficial to know the position of the rotor relative to the stator.

SUMMARY

The present disclosure provides a magnetic sensor system for monitoring the position of the rotor relative to the stator for use in electronic motor commutation. The system uses two magnetic sensors with a back bias magnet, the magnetic sensors being configured to detect changes in the magnetic field direction caused by the magnetic field interacting with two moveable targets that are being rotated by the motor shaft. The unique phase shift between the signals measured at each sensor can thus be used to determine the relative position between the stator and the rotor. In this respect, the system makes use of the Nonius or Vernier principle to measure rotational displacement, however, the scale of the encoder is defined by the number of motor pole pairs.

A first aspect of the present disclosure provides a magnetic sensor system, comprising at least one bias magnet configured to produce a magnetic field, a first magnetic sensor configured to detect changes to the magnetic field induced by a first magnetic target arranged to be rotated by a motor shaft, the first magnetic target having a first number of features for inducing a change in the magnetic field, a second magnetic sensor configured to detect changes to the magnetic field induced by a second magnetic target arranged to be rotated by a motor shaft, the second magnetic target having a second number of features for inducing a change in the magnetic field, and a processing circuit in communication with the first magnetic sensor and the second magnetic sensor, the processing circuit configured to detect a difference between measurements obtained by the first magnetic sensor and the second magnetic sensor, and generate shaft rotation angle information associated with a rotation angle of the motor shaft based on the detected differences between measurements obtained from the first magnetic sensor and the second magnetic sensor, wherein a difference between the first number of features and the second number of features is determined based on a number of pole pairs of the motor.

The difference between the first number of features and the second number of features may be equal to the number of pole pairs.

The processing circuit may be further configured to determine a position of a rotor of the motor relative to a stator of the motor based on the shaft rotation angle information.

The processing circuit may output a signal having a first number of electrical periods per revolution of the motor shaft, wherein the first number of electrical periods is equal to the number of pole pairs.

The processing circuit may be configured to output the position of the rotor relative to the stator to an electronic control unit for controlling an electrical output to the stator.

The processing circuit may be configured to generate shaft rotation angle information by counting at least one of the first number of features of the first magnetic target and the second number of features of the second magnetic target.

In some arrangements, the first and second magnetic sensors may comprise magnetoresistive angle sensors.

The first magnetic target may be a first toothed gear, the first toothed gear having a first number of teeth, and the second magnetic target may be a second toothed gear, the second toothed gear having a second number of teeth.

The system may further comprise the first toothed gear and the second toothed gear.

The first and/or second magnetic sensors may comprise a plurality of magnetoresistive elements, wherein the plurality of magnetoresistive elements are arranged on a sensor die in dependence on a tooth pitch of the corresponding toothed gear, the tooth pitch being a distance between adjacent teeth.

The first and/or second magnetic sensors may further comprise a first Wheatstone bridge circuit comprising a first set of magnetoresistive elements, and a second Wheatstone bridge circuit comprising a second set of magnetoresistive elements, wherein each Wheatstone bridge circuit comprises two regions of magnetoresistive elements, a distance between each region being half a tooth pitch.

In other arrangements, the first magnetic target may be a first set of features on a surface of a disc, and the second magnetic target may be a second set of features on the surface of a disc, wherein the first and second set of features are arranged as concentric rings. For example, the first and second set of features are one of: protrusions, holes, blind holes or indentations.

In some arrangement, the system further comprises the disc comprising the first and second set of features.

A second aspect of the present disclosure provides a method of monitoring a position of a shaft in an electronically commutated motor, the method comprising obtaining, from a first magnetic sensor, a first magnetic field measurement associated with rotation of the shaft, wherein the first magnetic field measurement is representative of changes induced by a first magnetic target in at least one magnetic field produced by at least one bias magnet, the first magnetic target having a first number of features for inducing a change in the magnetic field, obtaining, from a second magnetic sensor, a second magnetic field measurement associated with rotation of the shaft, wherein the second magnetic field measurement is representative of changes induced by a second magnetic target in the at least one magnetic field produced by the at least one bias magnet, the second magnetic target having a second number of features for inducing a change in the magnetic field, and generating, with a processing circuit, a measure of shaft rotation angle based on the first magnetic field measurement and the second magnetic field measurement, wherein a difference between the first number of features and the second number of features is determined based on a number of pole pairs of the motor.

The method may further comprise outputting the measure of the shaft rotation angle to an electronic control system. The measure of shaft rotation angle may have a first number of electrical periods per revolution of the motor shaft, wherein the first number of electrical periods is equal to the number of pole pairs.

The method may further comprise controlling a rotation of a rotor coupled to the shaft based on the measure of the shaft rotation angle.

BRIEF DESCRIPTION OF THE DRAWINGS

The present disclosure will now be described by way of example only with reference to the accompanying drawings in which:

FIGS. 8A-8B further illustrate an example of an angle sensor in accordance with embodiments of the disclosure.

DETAILED DESCRIPTION

The demands to improve performance and reduce noise, vibration, and harshness, and improve running efficiency of the BLDC motor drives (including electric power steering (EPS) systems) is resulting in a move away from block commutation to Sine commutation control. Hall switches can be replaced with a magnetoresistive (MR) angle sensor positioned in front of a magnet mounted on the motor shaft, the measured position being fed back into an electronic control unit (ECU) for controlling the rotation of the rotor.

The present disclosure provides a magnetic sensor system for monitoring the position of the rotor relative to the stator for use in electronic motor commutation. The system uses two magnetic sensors with a back bias magnet, the magnetic sensors being configured to detect changes in the magnetic field direction caused by the magnetic field interacting with two moveable targets that are being rotated by the motor shaft. The unique phase difference between the signals measured at each sensor can thus be used to determine the relative position between the stator and the rotor. In this respect, the system makes use of the Nonius or Vernier principle to measure rotational displacement, however, the scale of the encoder is defined by the number of motor pole pairs.

Figure 1:
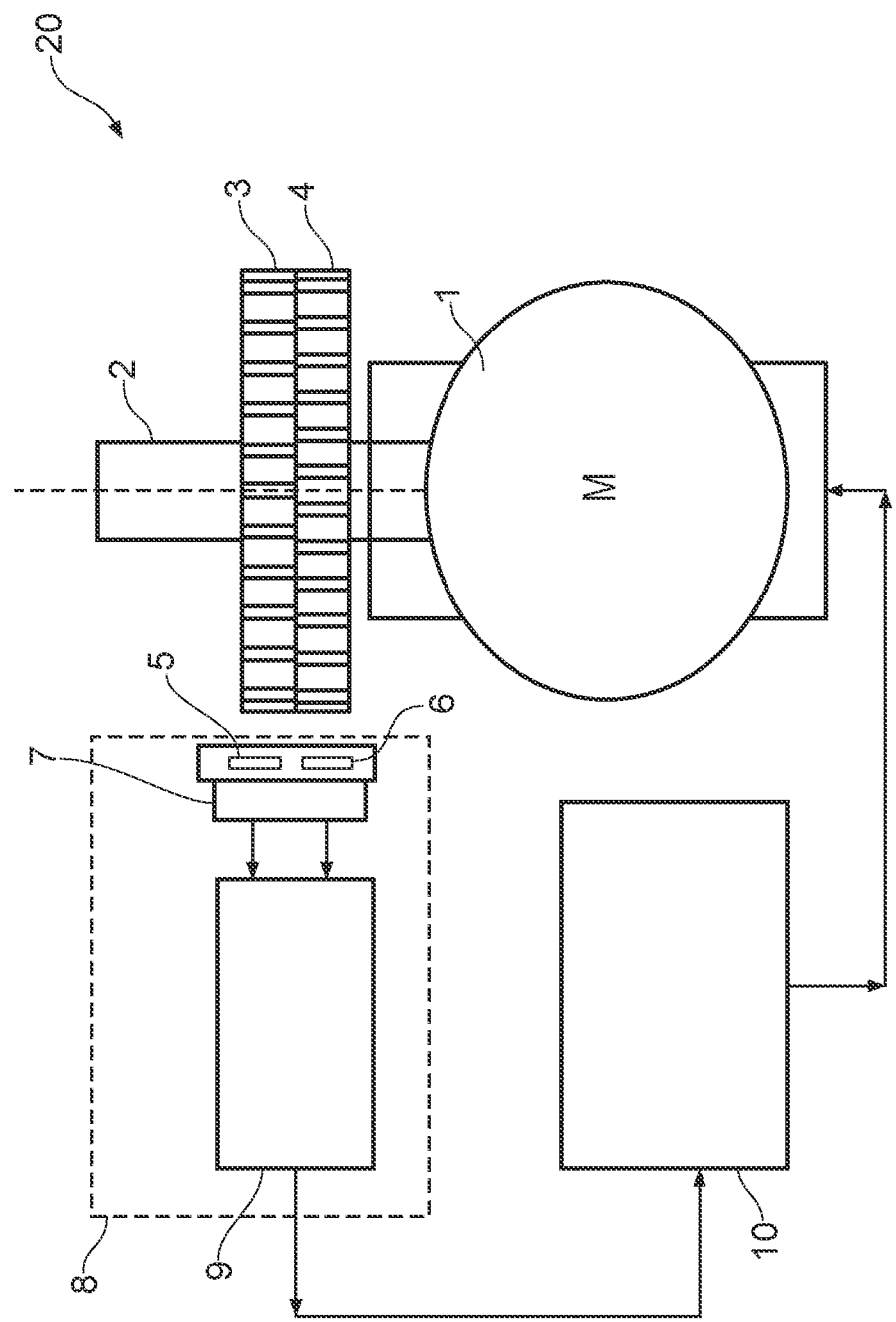
FIG. 1 is an example of a motor control system in accordance with embodiments of the disclosure.
Figure 2:
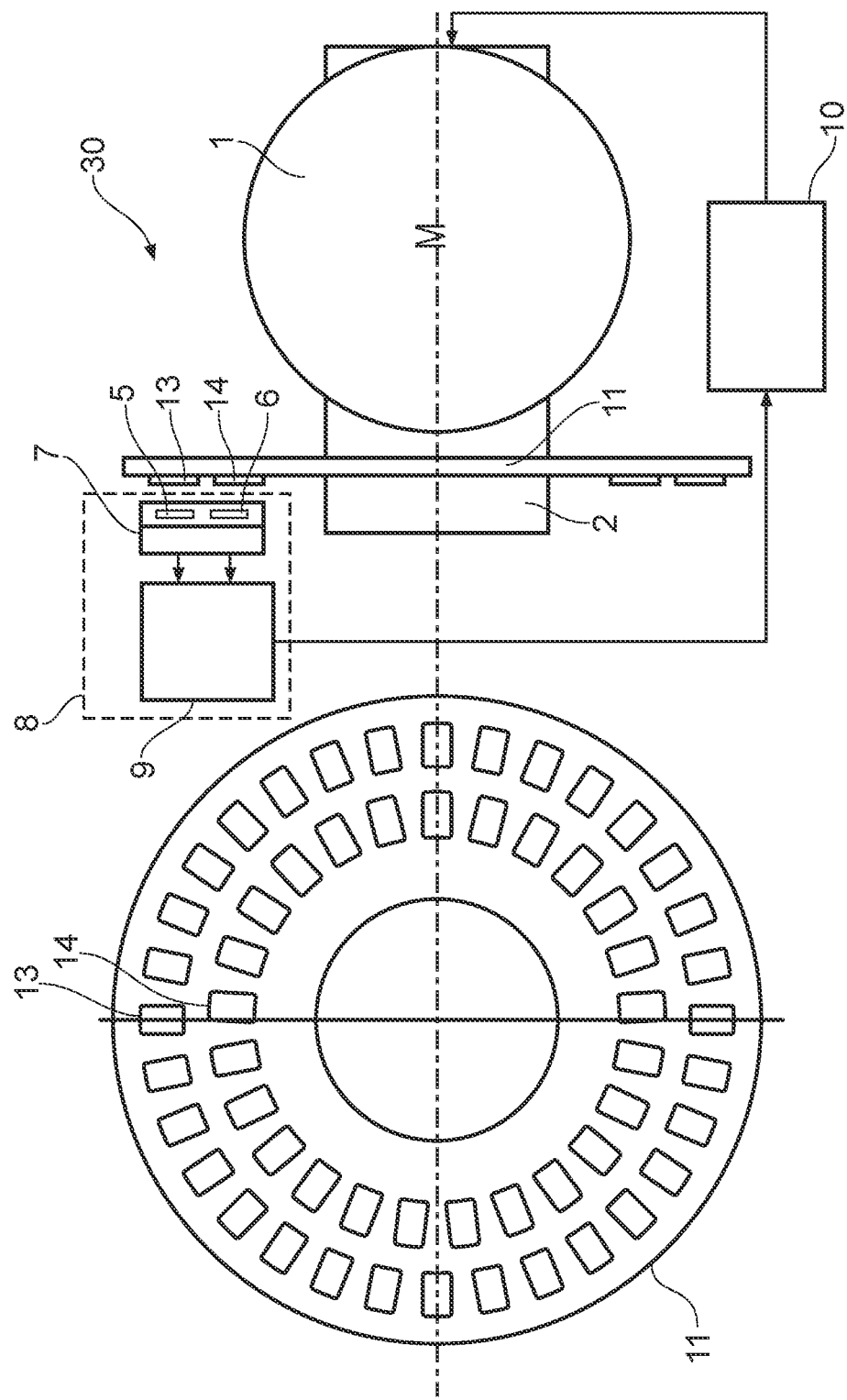
FIGS. 2A and 2B show a further example of a motor control system in accordance with embodiments of the disclosure.

FIGS. 1 and 2A-B illustrate how the rotor position may be measured using a magnetic sensor system and used as a feedback to the ECU 10 controlling an electronically commutated motor 1.

FIG. 1 illustrates a magnetic sensing system 20, which includes a sensor module 8 comprising a first magnetic sensor and a second magnetic sensor 6, with a back bias magnet 7 positioned at the back of the sensors 5 and 6. As shown in FIG. 1, system 20 may also include a processing circuit 9 that receives signals from the magnetic sensors 5 and 6, calculates rotation angle, and transmits the measured rotation angle to the ECU 10 or to another desired component. The magnetic field direction sensors such as sensors 5 and 6 can be based on, but are not limited to, Anisotropic Magneto Resistive (AMR) sensor elements, Giant Magneto Resistive (GMR) sensor elements, Tunnel Magneto Resistive sensor elements, any magnetoresistive sensing elements (xMR), or other suitable magnetic sensor technologies.

The magnetic sensors 5 and 6 are each positioned close to the surface of two moving targets 3 and 4 respectively. In this embodiment, the targets 3 and 4 are toothed gears that are affixed to the shaft 2 of the motor 1. In some applications, the sensors 5 and 6 may be configured to measure the absolute rotational position between 0° and 360° of shaft 2. To do this, the first target gear 3 is provided with more or fewer teeth than the second target gear 4. As an example, target gear 3 may have n teeth, while target gear 4 may have n−1 or n+1 teeth. In such an example, the Nonius principle applies and the absolute angle of rotation of both gears 3 and 4 can be inferred by measuring the relative displacement of teeth on target 3 with teeth on target 4 at the position of sensors 5 and 6. In particular, when target gears 3 and 4 differ in number of teeth by one, the relative offset between adjacent teeth of gears 3 and 4 at the position of the magnetic sensors 5 and 6 uniquely varies for an entire rotation of the shaft 2. Thus, by comparing measurements from sensors 5 and 6, the absolute angle of rotation of input shaft 2, between 0° and 360°, can be measured.

However, for electronic motor commutation, the absolute shaft position information is typically not used upon power up. To ensure the correct stator coil energizing sequence, the information used is the relative angle between the rotor and stator. This can instead be achieved by modifying the configuration described above, by providing the first target 3 with 'n' number of teeth and changing the number of teeth on the second target 4 to n+p or n−p where 'p' is the number of motor pole pairs (i.e. the number of permanent magnetic poles, north and south, on the rotor). The sensor module 8 will then provide 'p' electrical periods per 1 shaft revolution, from which the relative angle between the rotor and stator coils can be inferred and input to the ECU 10 to commutate the motor 1. Alternatively, the measure of the shaft rotation angle may be input to the ECU 10, which may then determine the relative angle of the rotor to thereby commutate the motor 1.

Figure 5A:
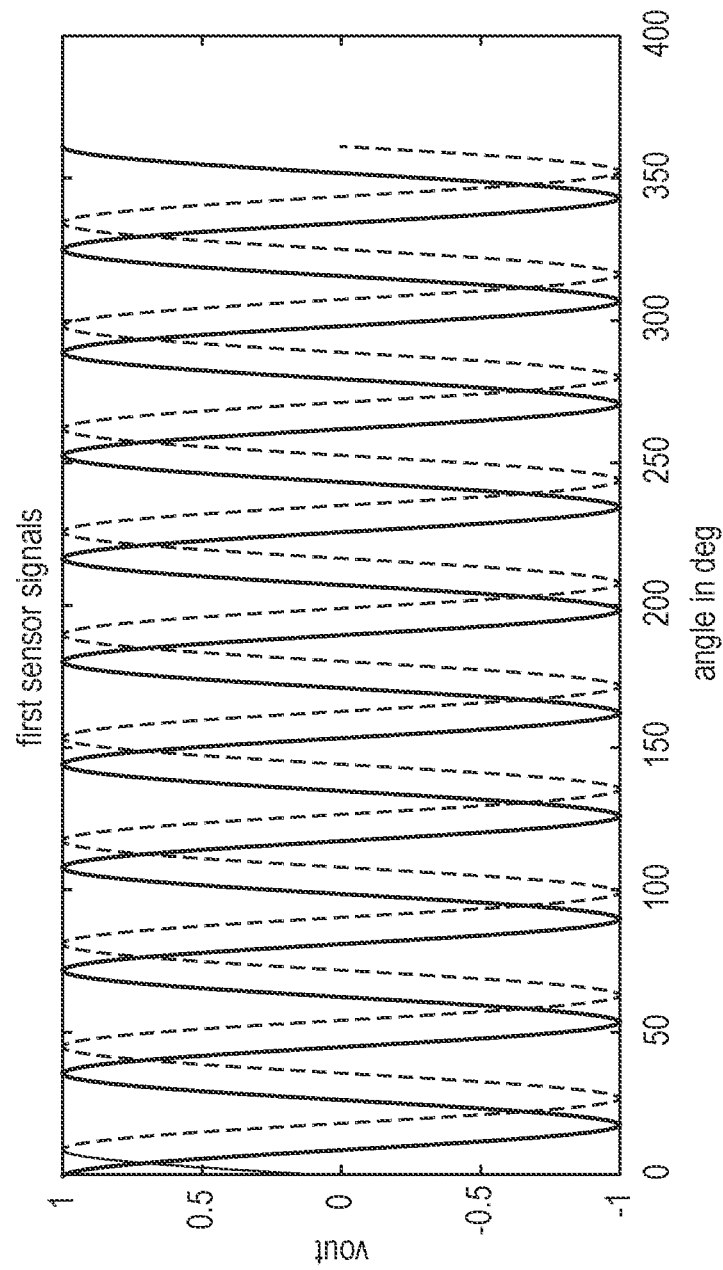
FIG. 5A is illustrates the magnetic sensor output in accordance with embodiments of the disclosure.
Figure 5B:
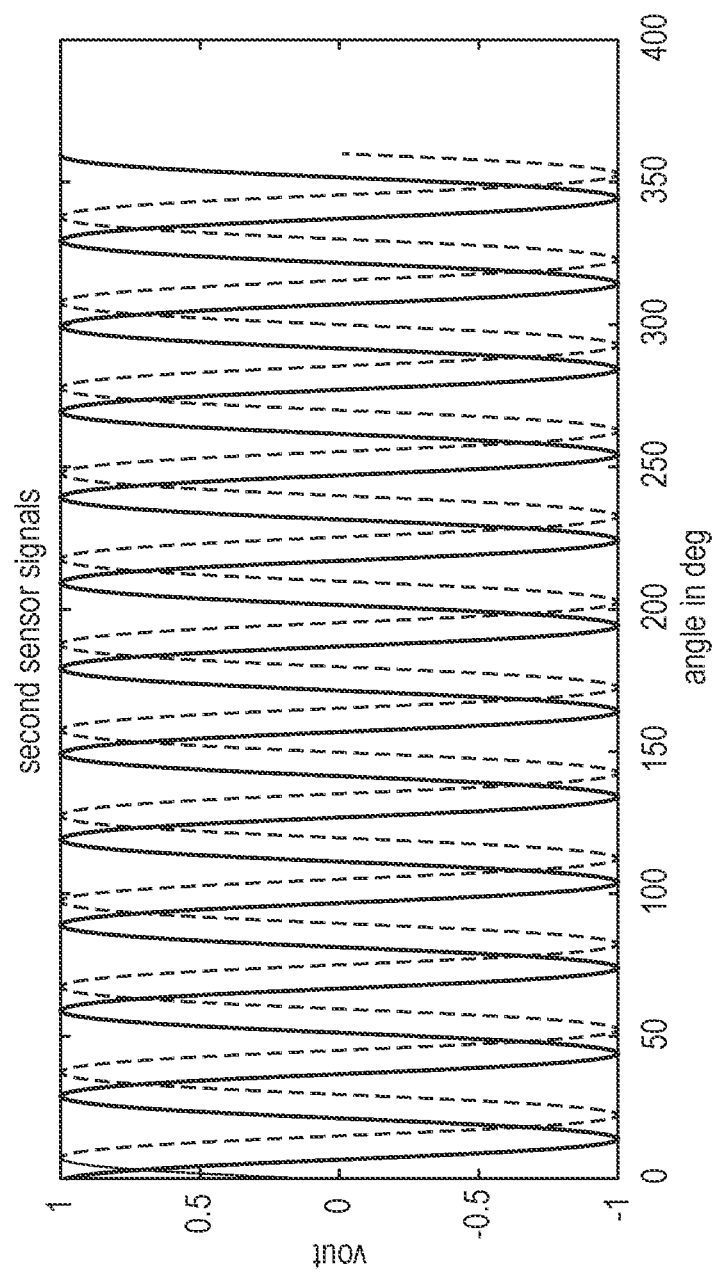
FIG. 5B is illustrates the magnetic sensor output in accordance with embodiments of the disclosure.
Figure 5C:
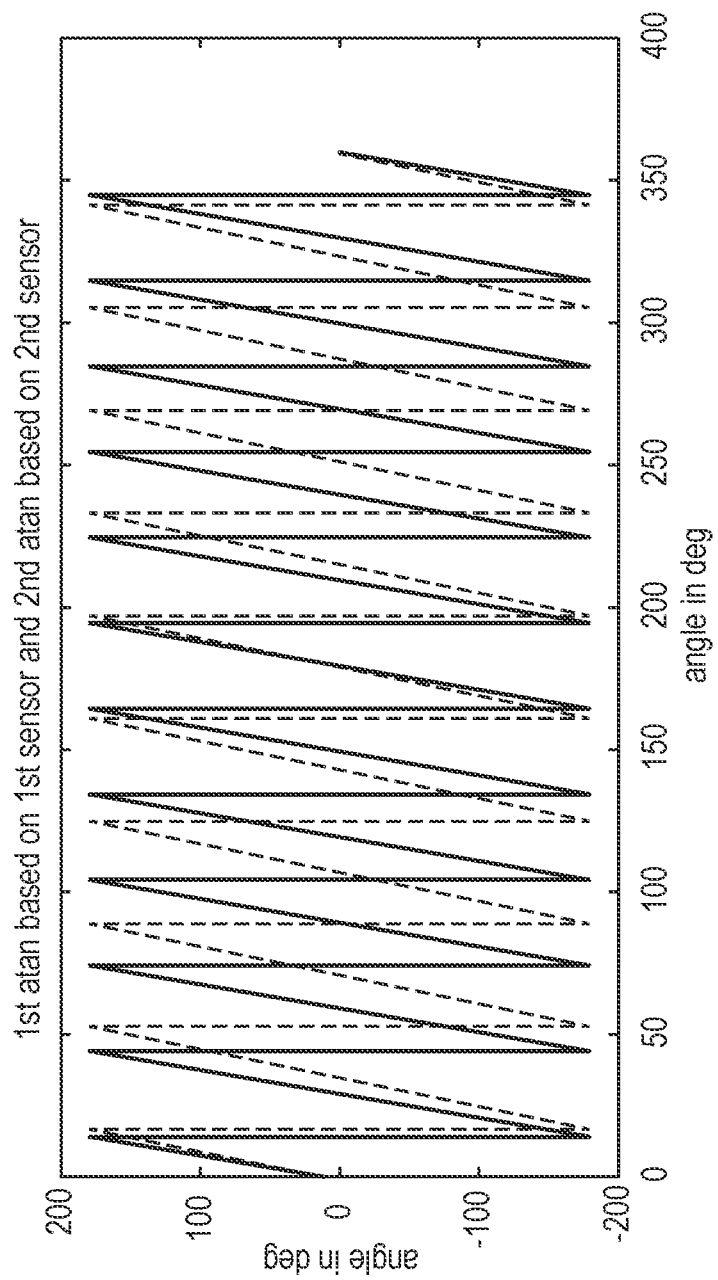
FIG. 5C is illustrates the magnetic sensor output in accordance with embodiments of the disclosure.
Figure 5D:
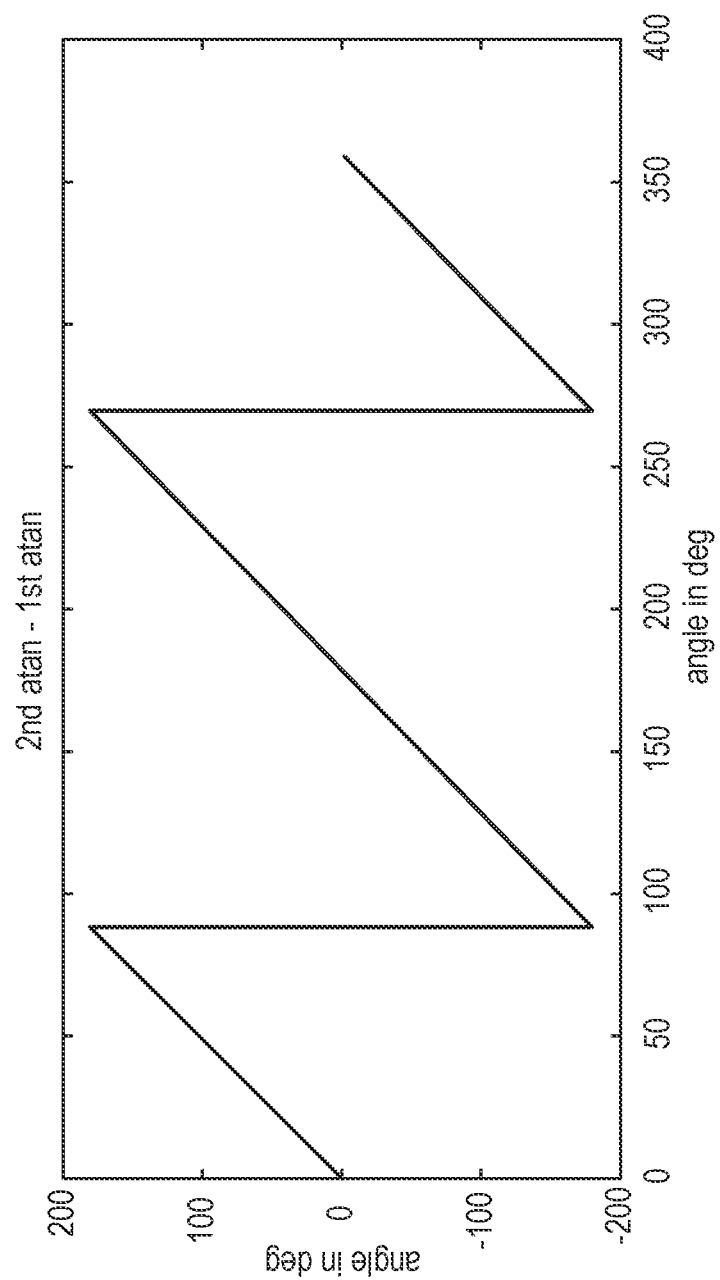
FIG. 5D is illustrates the magnetic sensor output in accordance with embodiments of the disclosure.

In this respect, FIGS. 5A-D illustrate how the outputs of sensors 5 and 6 are processed to provide the relative angle between the rotor and stator. In operation, sensors 5 and 6 detect the measurable changes in the magnetic field direction passing through the sensors 5 and 6, as a result of the magnetic targets 3 and 4 rotating and interacting with the magnetic field generated by the magnet 7. FIG. 5A shows the sine and cosine components of the signal measured at the first sensor 5 as the magnetic field associated with the first magnetic target 3 passes through, whilst FIG. 5B shows the sine and cosine components of the signal measured at the second sensor 6 as the magnetic field associated with the second magnetic target 4 passes through. The "arctan" of each sensor signal (i.e. the sine value divided by the cosine value) is then calculated, as shown in FIG. 5C. The difference between the arctan values determined for each sensor 5 and 6 is then determined, as shown in FIG. 5D.

The difference in the number of teeth (or other features that induce a change in the magnetic field) between target gears 3 and 4 therefore results in a unique phase shift at the angle of rotation within each "p" electrical period per rotation of the shaft (e.g., between 0° and 180° for p=2 electrical periods). That is to say, for example, for a motor having two pole pairs, a unique phase shift between the two sensor signals is obtained at each angle within a 180° rotation. As another example, a motor having three pole pairs results in a unique phase shift between the two sensor signals at each angle within a 120° rotation.

As such, the relative angle between the rotor and the stator can be determined to a sufficient resolution to enable the motor 1 to be commuted so that the stator coil energizing sequence can be aligned and synchronized with the rotation of the rotor, that is, to ensure that the rotor remains in synchronization with the rotating magnetic field generated by the stator coils being energized by the applied current. In this respect, the poles in the rotor synchronize with the opposing rotating magnetic pole of the magnetic field, and so the current supplied to the stator windings should be periodically reversed to match the rotation of the magnetic field with the rotation of the rotor. For example, in a two-pole pair motor, the current should be rotated for each 180 degrees of rotor rotation. For example, in a three-pole pair motor, the current should be rotated for each 120 degrees of rotor rotation. As such, the resolution of the magnetic sensor system 20 can be selected based on the number of pole pairs in the motor.

This arrangement is further advantageous in that the relative position between the rotor and the stator can be automatically determined upon start up. Once the starting position is determined using the methods described above, the absolute position of the rotor can also be determined by counting the teeth of the first and/or second toothed gears 3, 4 as they pass through the magnetic field.

FIGS. 2A-2B illustrate an alternative sensor system 30 arrangement, which again includes a sensor module 8 comprising a first magnetic sensor 5 and a second magnetic sensor 6, with a back bias magnet 7 positioned at the back of the sensors 5 and 6, as described with reference to FIG. 1.

As before, the magnetic sensors 5 and 6 are each positioned close to the surface of two moving targets 13 and 14 respectively. However, in this embodiment, the targets 13 and 14 are two sets of raised protrusions on the surface of a rotating disc 11 or gear that is affixed to the shaft 2 of the motor 1. The raised protrusions 13 and 14 are arranged around the circumference of the disc 11. The first set of protrusions 13 are arranged at a first radial position near the edge of disc 11, whilst the second set of protrusions 14 are arranged at a second radial position closer to the center of the disc 11. In operation, sensor 5 detects the measurable changes in the magnetic field direction passing through it as a result of the first set of protrusions 13 interacting with the magnetic field as the disc 11 rotates, whilst sensor 6 detects the measurable changes in the magnetic field direction passing through it as a second of the first set of protrusions 14 interacting with the magnetic field as the disc 11 rotates. As before, the first target set of protrusions 13 is provided with more or fewer protrusions as the second set of protrusions 14, defined by the number of motor pole pairs. As an example, the first set of protrusions 13 may haven protrusions, while the second set of protrusions 14 may have n–p or n+p protrusions. The Nonius principle can then again be applied and the unique phase shift between the two sensor measurements over each electrical period can be used to determine the angle of rotation of input shaft 2, for example, between 0° and 180° in case of 2 pole pairs.

Whilst the above example describes sets of raised protrusions on surface of the rotating disc 11, it will be appreciated that these may be replaced with holes, blind holes, indentations or other features that are capable of inducing a change in the magnetic field as the disc 11 rotates.

Figure 3:
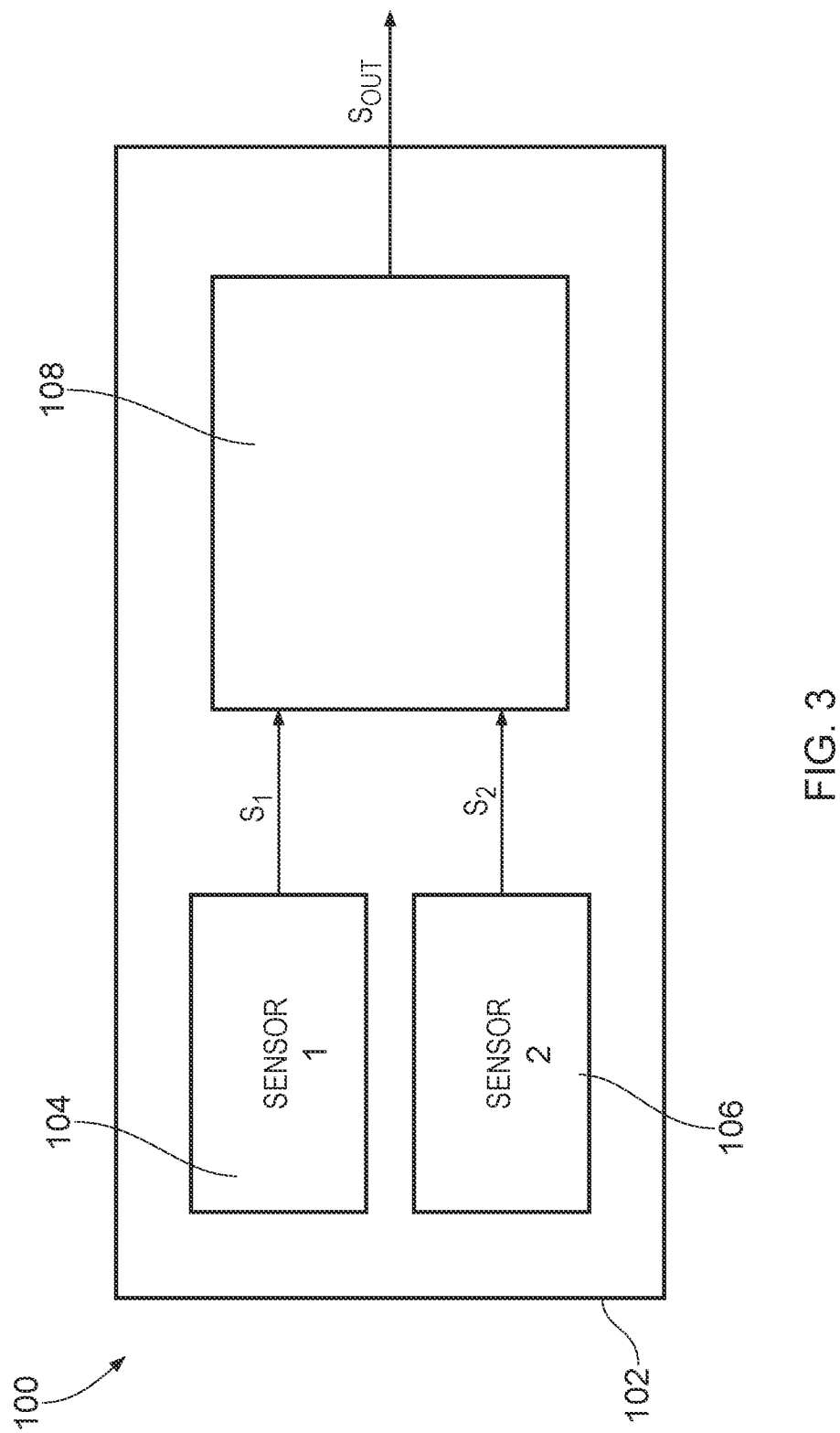
FIG. 3 is a schematic block diagram illustrating a magnetic sensor system in accordance with embodiments of the disclosure.

FIG. 3 illustrates a schematic block diagram of an example magnetic sensor 100 that includes a first angle sensor 104 and a second angle sensor 106 used in embodiments of the present disclosure. In this respect, the first angle sensor 104 may be used as sensor 5 described with reference to FIGS. 1 and 2 above, whilst the second angle sensor 106 may be used as sensor 6 described with reference to FIGS. 1 and 2. The angle sensors 104 and 106 may be a magnetic angle sensor, for example, an anisotropic magnetoresistive (AMR), giant magnetoresistive (GMR) or tunnel magnetoresistive (TMR) based sensor, a Hall sensor or an inductive sensor.

The sensor 100 also comprises a processing circuit 108, and an integrated circuit 102 on which the first angle sensor 104, the second angle sensor 106 and processing circuit 108 are disposed. The processing circuit 108 receives signals S1 from the first angle sensor 104 and processes the received signals to determine the absolute position of the first rotating target. Similarly, the processing circuit 106 may also receive signals S2 from the second angle sensor 106 and process the received signals to output an angular position of the second rotating target. The processing circuit 108 will process these received signals to provide an output signal SOUT indicative of the rotational angular position of the rotor shaft 2, as described above.

Figure 4:
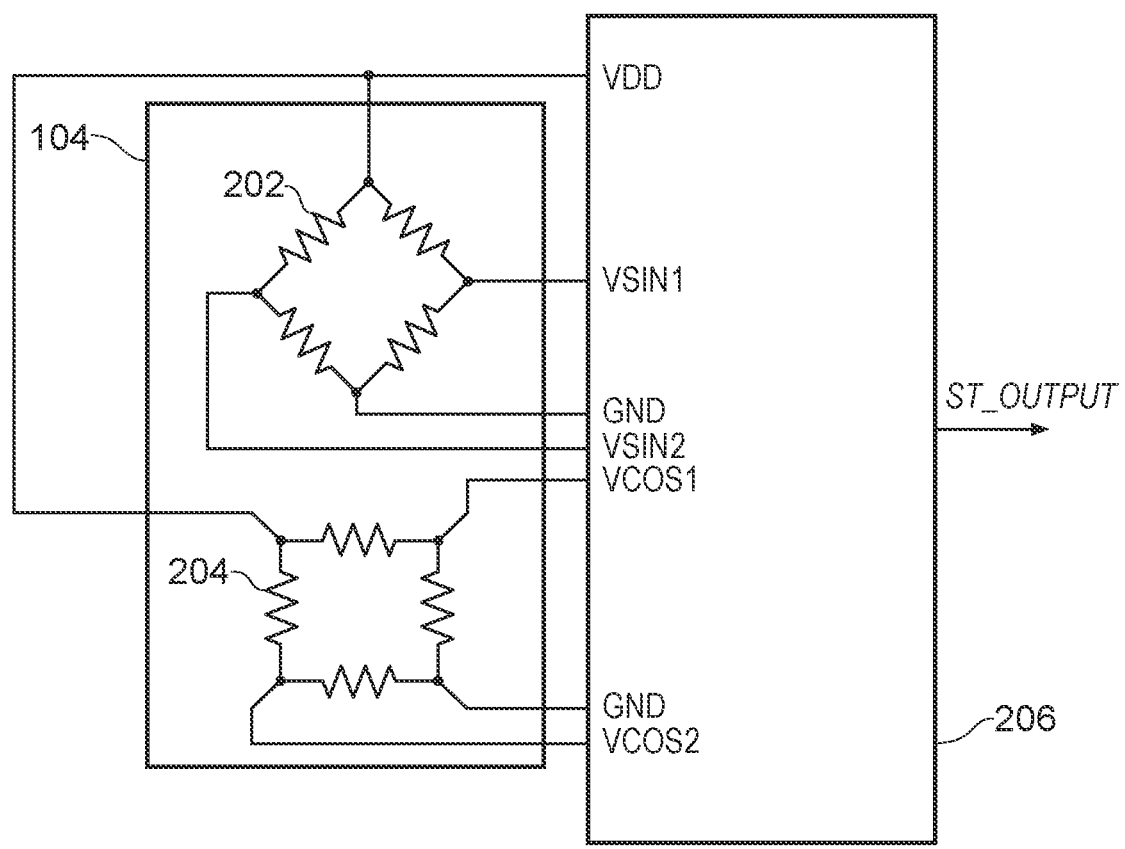
FIG. 4 is an example of an angle sensor in accordance with embodiments of the disclosure.

FIG. 4 is a schematic diagram showing an example of a magnetic angle sensor 104 (or 106) with an interface circuit 206 according to an embodiment of the present disclosure. The interface circuit 206 can be part of the processing circuit 108. Alternatively, the interface circuit 206 can be a separate circuit between the processing circuit 108 and the output of the angle sensor 104. As shown in FIG. 4, the angle sensor 104 includes a first Wheatstone bridge 202 and a second Wheatstone bridge 204.

The first and second Wheatstone bridges 202 and 204, respectively, can include magneto-resistive elements, such as AMR elements, to sense a rotating magnetic field and to provide rotational angle between 0 and 360 degrees, which also corresponds to an angle of between 0 and 2n radians. Additionally, each AMR element can be patterned onto an integrated circuit using an AMR process so that the first Wheatstone bridge 202 is rotated with respect to the second Wheatstone bridge 204. By having the first and second Wheatstone bridges 202 and 204 rotated with respect to each other, the trigonometric sine and cosine of a rotational magnetic field can be determined over a range of 0 to 360 degrees.

As shown in FIG. 4, both the first and the second Wheatstone bridges 202 and 204, respectively, are electrically connected to a supply voltage VDD and to ground GND. As illustrated, the interface circuit 206 receives voltages VSIN1 and VSIN2 from the sense nodes of the first Wheatstone bridge 202 and receives voltages VCOS1 and VCOS2 from the sense nodes of the second Wheatstone bridge 204. The voltages VSIN1, VSIN2, VCOS1, and VCOS2 of FIG. 4 can represent components of the signals S1 (or S2) of FIG. 3. The interface circuit 206 can process the voltages VSIN1 and VSIN2 and the voltages VCOS1 and VCOS2 to determine sine and cosine signals, respectively, associated with a magnetic field. From the sine and cosine signals, the interface circuit 206 can determine the angle of the magnetic field between 0 and 360 degrees. In the embodiment of FIG. 4, the interface circuit 206 provides a single turn angle output data ST_Output.

Figure 6A:
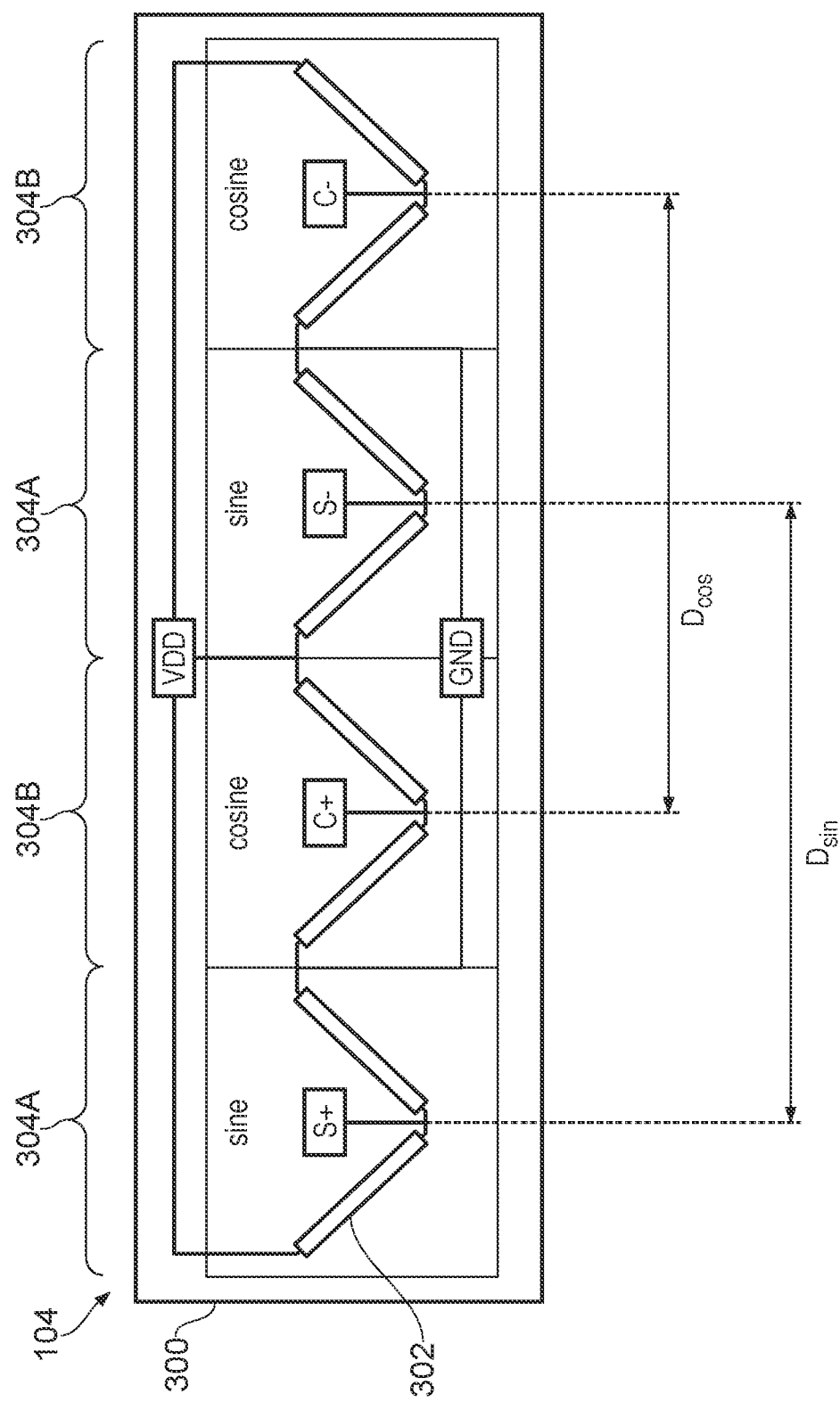
FIGS. 6A-6B illustrate a further example of an angle sensor in accordance with embodiments of the disclosure.

FIG. 6A illustrates another example of a magnetic angle sensor 104 (or 106), wherein the magnetoresistive sensor elements 302 on the sensor die 300 are arranged to match the pitch of the toothed gears 3 and 4. In this example, there are two Wheatstone bridges comprising magnetoresistive sensor elements 302, a first Wheatstone bridge (denoted by areas 304A) for the sine output and a second Wheatstone bridge (denoted by areas 304B) for the cosine output. The distance D sin between the two sine areas 304A and the distance D cos between the two cosine areas 304B are both equal to half the tooth pitch, the tooth pitch being the distance between adjacent teeth as measured from a corresponding point on each tooth.

Figure 6B:
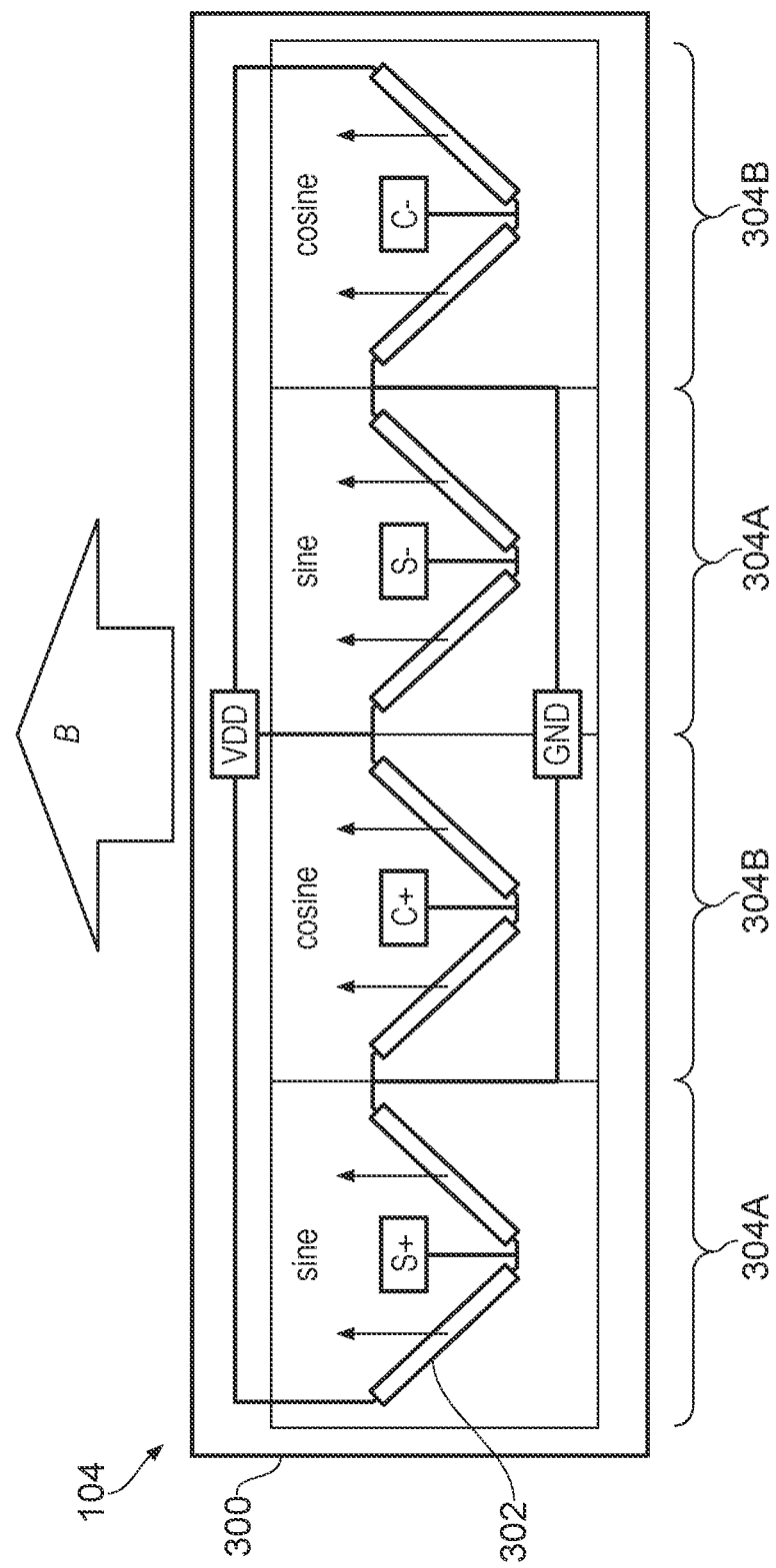

As shown by the arrows in FIG. 6B, when a biasing magnetic field, having a magnetic flux density B, is applied, the magnetization for each magnetoresistive sensor element 302 will be aligned in the same direction.

Figure 7A:
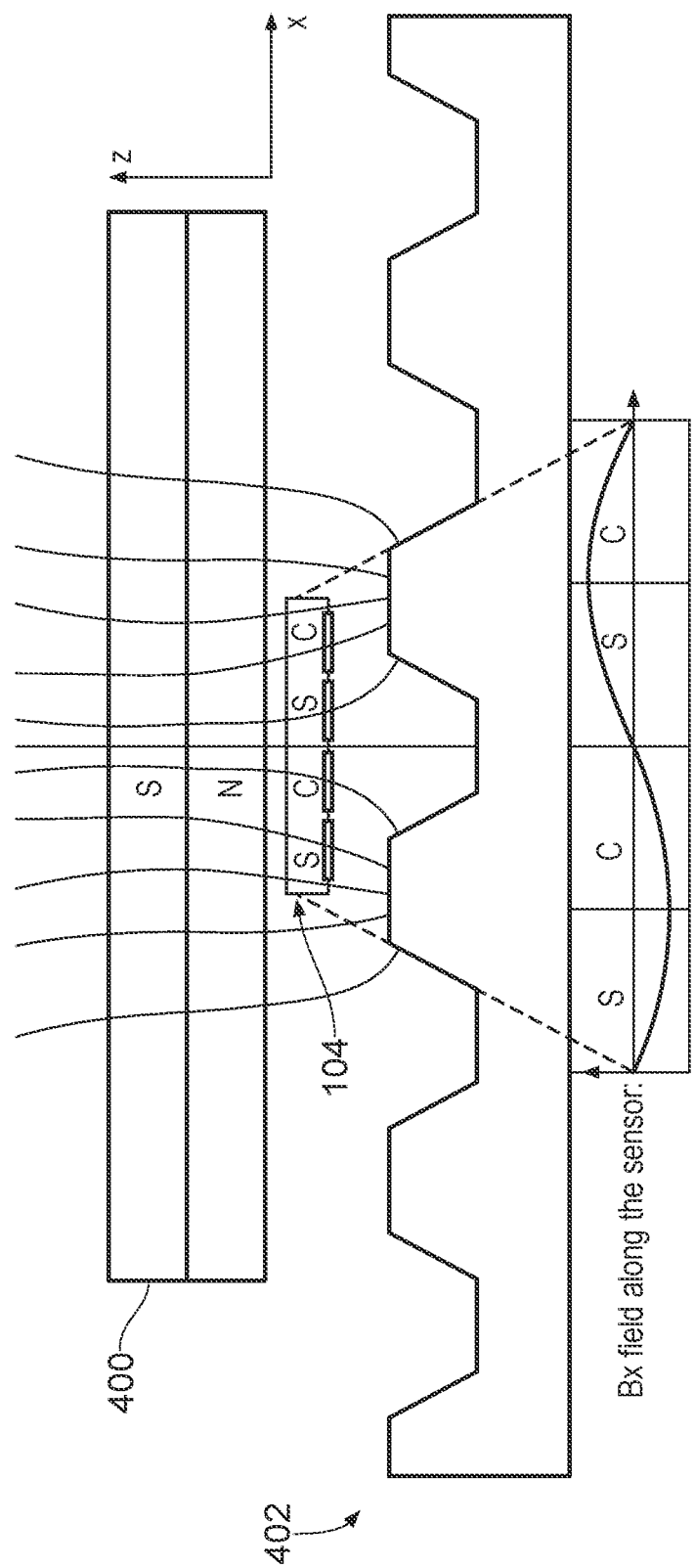
FIGS. 7A-7B further illustrate an example of an angle sensor in accordance with embodiments of the disclosure.
Figure 7B:
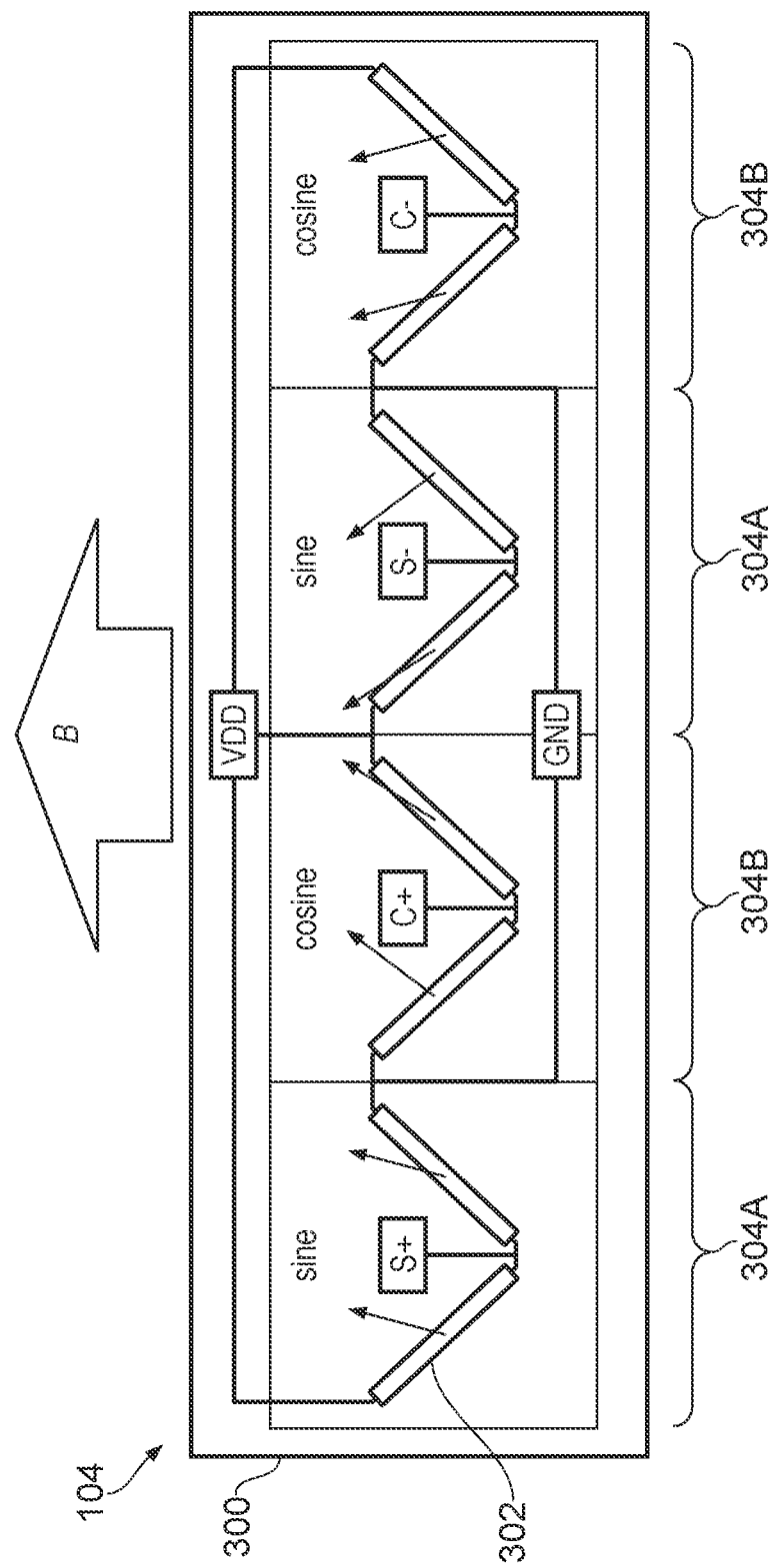

FIGS. 7A-7B illustrate the effect on the magnetic alignment when the magnetic sensor 104 is used as part of a magnetic sensing system, such as that described with reference to FIG. 1. The sensor 104 is arranged between a back bias magnet 400 and a toothed gear 402 (partially shown), with the toothed gear 402 being in a first position. The gear 402 interacts with the magnetic field and causes the magnetic field lines to bend, which in turn causes the magnetization of the magnetoresistive elements to change direction in the different sine and cosine areas 304A, 304B, as illustrated by the arrows in FIG. 7B.

Figure 8B:
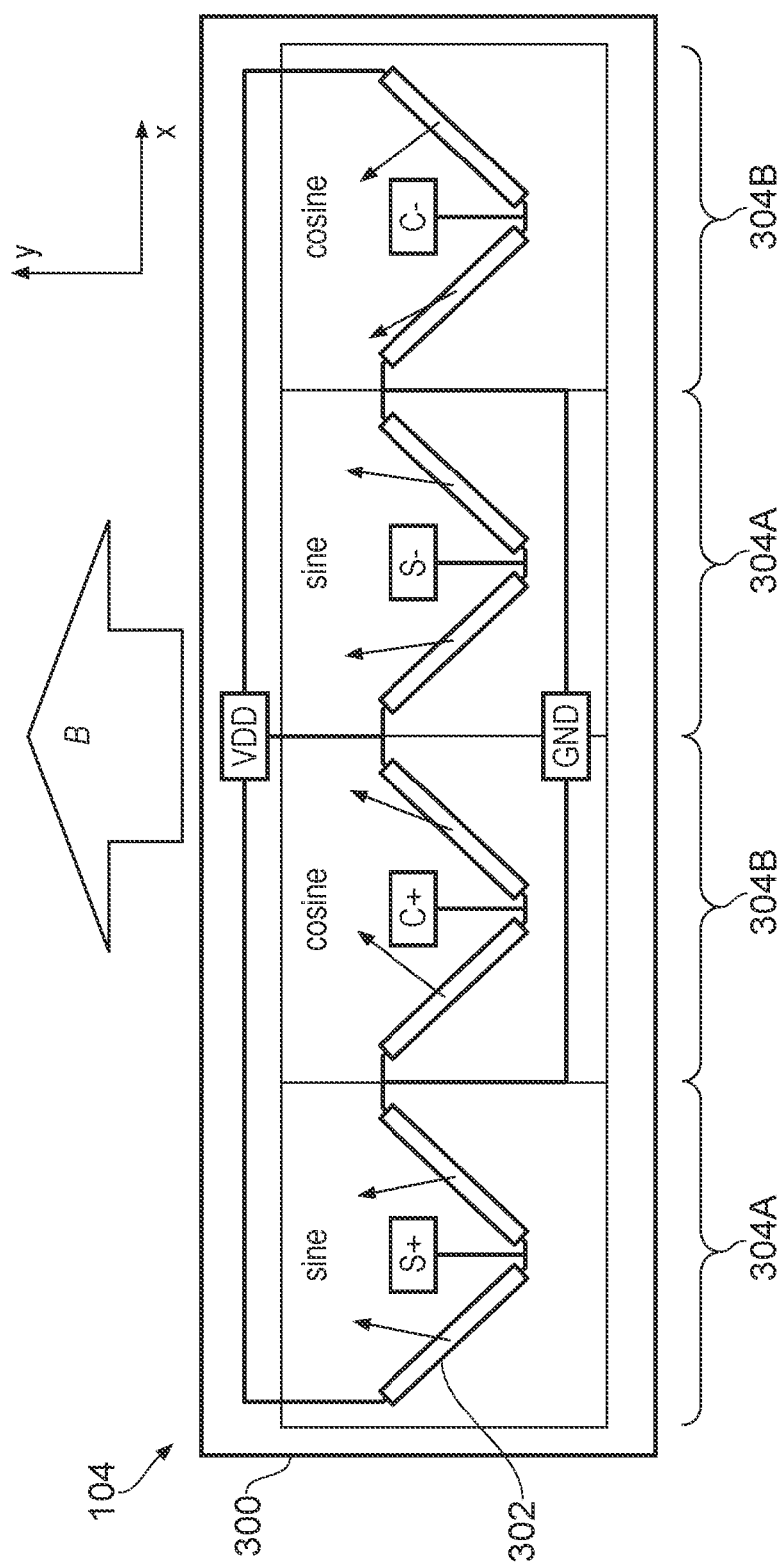

As the toothed gear 402 rotates, the magnetic field will continuously change and cause a sinusoidal change in the sensor signals per one pitch of rotation. In FIG. 8A, the toothed gear 402 has moved by a quarter pitch, causing the magnet field direction to change, which in turn causes the magnetic alignment of the magnetoresistive elements 302 to change, illustrated again by the arrows in FIG. 8B, to thereby give a different sensor reading.

Applications

Any of the principles and advantages discussed herein can be applied to other systems, not just to the systems described above. Some embodiments can include a subset of features and/or advantages set forth herein. The elements and operations of the various embodiments described above can be combined to provide further embodiments. The acts of the methods discussed herein can be performed in any order as appropriate. Moreover, the acts of the methods discussed herein can be performed serially or in parallel, as appropriate. While circuits are illustrated in particular arrangements, other equivalent arrangements are possible.

Any of the principles and advantages discussed herein can be implemented in connection with any other systems, apparatus, or methods that benefit could from any of the teachings herein. For instance, any of the principles and advantages discussed herein can be implemented in connection with any devices that correct rotational angle position data derived from rotating magnetic fields. Additionally, the devices can include any magnetoresistance or Hall effect devices capable of sensing magnetic fields.

Aspects of this disclosure can be implemented in various electronic devices or systems. For instance, phase correction methods and sensors implemented in accordance with any of the principles and advantages discussed herein can be included in various electronic devices and/or in various applications. Examples of the electronic devices and applications can include, but are not limited to, servos, robotics, aircraft, submarines, toothbrushes, biomedical sensing devices, and parts of the consumer electronic products such as semiconductor die and/or packaged modules, electronic test equipment, etc. Further, the electronic devices can include unfinished products, including those for industrial, automotive, and/or medical applications.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). The words "based on" as used herein are generally intended to encompass being "based solely on" and being "based at least partly on." Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

While certain embodiments have been described, these embodiments have been presented by way of example only, and are not intended to limit the scope of the disclosure. Indeed, the novel apparatus, systems, and methods described herein may be embodied in a variety of other forms. Furthermore, various omissions, substitutions and changes in the form of the methods and systems described herein may be made without departing from the spirit of the disclosure.

The invention claimed is:

1. A magnetic sensor system, comprising:
   at least one bias magnet configured to produce a magnetic field;
   a first magnetic sensor configured to detect changes to the magnetic field induced by a first magnetic target arranged to be rotated by a motor shaft, the first magnetic target having a first number of features for inducing a change in the magnetic field;

a second magnetic sensor configured to detect changes to the magnetic field induced by a second magnetic target arranged to be rotated by the motor shaft, the second magnetic target having a second number of features for inducing a change in the magnetic field; and a processing circuit in communication with the first magnetic sensor and the second magnetic sensor, the processing circuit configured to:

detect a difference between measurements obtained by the first magnetic sensor and the second magnetic sensor;

generate first shaft rotation angle information associated with a rotation angle of the motor shaft based on the detected differences between measurements obtained from the first magnetic sensor and the second magnetic sensor; and generate second rotation angle information relative to the first shaft rotation angle information based on a count of the first number of features of the first magnetic target measured by the first magnetic sensor or a count of the second number of features of the second magnetic target measured by the second magnetic sensor, wherein a difference between the first number of features and the second number of features is determined based on a number of pole pairs of the motor.

2. The magnetic sensing system according to claim 1, wherein the difference between the first number of features and the second number of features is equal to the number of pole pairs.

3. The magnetic sensing system according to claim 1, wherein the processing circuit is further configured to determine a position of a rotor of the motor relative to a stator of the motor based on the first shaft rotation angle information.

4. The magnetic sensing system according to claim 3, wherein the processing circuit is configured to output the position of the rotor relative to the stator to an electronic control unit for controlling an electrical output to the stator.

5. The magnetic sensing system according to claim 1, wherein the processing circuit outputs a signal having a first number of electrical periods per revolution of the motor shaft, wherein the first number of electrical periods is equal to the number of pole pairs.

6. The magnetic sensing system according to claim 1, wherein the processing circuit is configured to generate third shaft rotation angle information by counting at least one of the first number of features of the first magnetic target and the second number of features of the second magnetic target.

7. The magnetic sensing system according to claim 1, wherein the first and second magnetic sensors comprise magnetoresistive angle sensors.

8. The magnetic sensing system according to claim 1, wherein:

the first magnetic target is a first toothed gear, the first toothed gear having a first number of teeth; and the second magnetic target is a second toothed gear, the second toothed gear having a second number of teeth.

9. The magnetic sensing system according to claim 8, further comprising the first toothed gear and the second toothed gear.

10. The magnetic sensing system according to claim 8, wherein the first and/or second magnetic sensors comprise a plurality of magnetoresistive elements, wherein the plurality of magnetoresistive elements are arranged on a sensor die in dependence on a tooth pitch of the corresponding toothed gear, the tooth pitch being a distance between adjacent teeth.

11. The magnetic sensing system according to claim 10, wherein the first and/or second magnetic sensor comprises:

a first Wheatstone bridge circuit comprising a first set of magnetoresistive elements; and a second Wheatstone bridge circuit comprising a second set of magnetoresistive elements;

wherein each Wheatstone bridge circuit comprises two regions of magnetoresistive elements, a distance between each region being half a tooth pitch.

12. The magnetic sensing system according to claim 1, wherein:

the first magnetic target is a first set of features on a surface of a disc; and the second magnetic target is a second set of features on the surface of the disc;

wherein the first and second set of features are arranged as concentric rings.

13. The magnetic sensing system according to claim 12, further comprising the disc comprising the first and second set of features.

14. The magnetic sensing system according to claim 12, wherein the first and second set of features are one of: protrusions, holes, blind holes or indentations.

15. A method of monitoring a position of a shaft in an electronically commutated motor, the method comprising:

obtaining, from a first magnetic sensor, a first magnetic field measurement associated with a rotation of the shaft, wherein the first magnetic field measurement is representative of changes induced by a first magnetic target in at least one magnetic field produced by at least one bias magnet, the first magnetic target having a first number of features for inducing a change in the magnetic field;

obtaining, from a second magnetic sensor, a second magnetic field measurement associated with the rotation of the shaft, wherein the second magnetic field measurement is representative of changes induced by a second magnetic target in the at least one magnetic field produced by the at least one bias magnet, the second magnetic target having a second number of features for inducing a change in the magnetic field;

generating, with a processing circuit, first shaft rotation angle information based on the first magnetic field measurement and the second magnetic field measurement;

generate second rotation angle information relative to the first shaft rotation angle information based on a count of the first number of features of the first magnetic target measured by the first magnetic sensor or a count of the second number of features of the second magnetic target measured by the second magnetic sensor, wherein a difference between the first number of features and the second number of features is determined based on a number of pole pairs of the motor.

16. The method according to claim 15, further comprising outputting the first shaft rotation angle information to an electronic control system.

17. The method according to claim 15, wherein the first of shaft rotation angle information has a first number of electrical periods per revolution of the motor shaft, wherein the first number of electrical periods is equal to the number of pole pairs.

18. The method according to claim 15, further comprising controlling a rotation of a rotor coupled to the shaft based on the first shaft rotation angle information.

\* \* \* \* \*

UNITED STATES PATENT AND TRADEMARK OFFICE
CERTIFICATE OF CORRECTION

PATENT NO. : 11,637,482 B2  
APPLICATION NO. : 17/448628  
DATED : April 25, 2023  
INVENTOR(S) : Jochen Schmitt et al.

Page 1 of 1

It is certified that error appears in the above-identified patent and that said Letters Patent is hereby corrected as shown below:

On the Title Page

Column 2, Line 3, under Other Publications, delete "Sensoren" and insert --Sensors--.

In the Specification

In Column 6, Line 10 (Approx.), delete "haven" and insert --have n--.

In Column 7, Line 30, delete "D sin" and insert --Dsin--.

In Column 7, Lines 30-31 (Approx.), delete "D cos" and insert --Dcos--.

In the Claims

In Column 10, Claim 17, Line 63, after "first", delete "of".

Signed and Sealed this  
Eighteenth Day of July, 2023

Katherine Kelly Vidal  
*Director of the United States Patent and Trademark Office*